United States Patent
Ishizuka (10) Patent No.: US 8,126,351 B2
(45) Date of Patent: Feb. 28, 2012

(54) PRINTING APPARATUS WITH ENERGY MANAGEMENT AND DISPLAY

(75) Inventor: Hisashi Ishizuka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 705 days.

(21) Appl. No.: 12/241,222

(22) Filed: Sep. 30, 2008

(65) Prior Publication Data
US 2009/0110427 A1    Apr. 30, 2009

(30) Foreign Application Priority Data
Oct. 26, 2007   (JP) ................................. 2007-279077

(51) Int. Cl.
*G03G 15/00* (2006.01)
(52) U.S. Cl. ......................................... 399/88
(58) Field of Classification Search .................. 399/37, 399/88
See application file for complete search history.

(56) References Cited

U.S. PATENT DOCUMENTS

2004/0246512 A1 *   12/2004   Miyamoto ................... 358/1.13
* cited by examiner

*Primary Examiner* — David Gray
*Assistant Examiner* — Barnabas Fekete
(74) *Attorney, Agent, or Firm* — Marvin A. Motsenbocker; Mots Law, PLLC (57) ABSTRACT

An aspect of the invention provides a printing apparatus having a plurality of operation modes that comprises: a storage unit configured to store power consumption values per unit time for each operation mode and a standard power consumption value indicating an energy-saving standard power consumption during a determined period of use; an operation mode management unit configured to measure an operation time of the printing apparatus for each operation mode; a calculator configured to calculate an estimated total power consumption value during the determined period of use from measured operation time in each operation mode and from the power consumption values stored in the storage unit; and a display unit configured to display both of the standard power consumption value obtained from the storage unit and the calculated estimated total power consumption value.

15 Claims, 12 Drawing Sheets

ILLUSTRATION (BAR CHART) OF DISPLAY UNIT OF FIRST EMBODIMENT

FIG. 1

100,200: PRINTING APPARATUS
101: PRINTER
105: DISPLAY UNIT
102: STANDARD TRAY
103: SECOND TRAY
104: LARGE-CAPACITY TRAY

VIEW SHOWING EMBODIMENTS OF PRINTING APPARATUS

FIG. 2

| REFERENCE | POWER VALUE (wh) |
|---|---|
| STANDARD VALUE OF INTERNATIONAL ENERGY STAR PROGRAM | 10000 |
| MEASURED VALUE OF INTERNATIONAL ENERGY STAR PROGRAM | 9500 |

| STATE OF USER USAGE | | | POWER VALUE (wh) |
|---|---|---|---|
| ESTIMATED TOTAL POWER VALUE | STARTING DATE | FINISHING DATE | |
| | 2006/12/ 4 | 2006/12/10 | 6200 |
| | 2006/12/11 | 2006/12/17 | 7500 |
| | 2006/12/18 | 2006/12/24 | 8300 |

ILLUSTRATION OF DISPLAY UNIT OF FIRST EMBODIMENT

FIG. 4

BLOCK DIAGRAM OF CONFIGURATION OF PRINTING APPARATUS OF FIRST EMBODIMENT

FIG. 5A

| REFERENCE | POWER VALUE (wh) |
|---|---|
| STANDARD VALUE OF INTERNATIONAL ENERGY STAR PROGRAM | 10000 |
| MEASURED VALUE OF INTERNATIONAL ENERGY STAR PROGRAM | 9500 |

FIG. 5B

| CONFIGURATION, | OPERATION MODE | CONSUMPTION POWER (w) |
|---|---|---|
| MAIN BODY ONLY | 1 | 200 |
| MAIN BODY ONLY | 2 | 500 |
| MAIN BODY ONLY | 3 | 20 |
| MAIN BODY AND 4 TRAYS | 4 | 205 |
| MAIN BODY AND 4 TRAYS | 5 | 520 |
| MAIN BODY AND 4 TRAYS | 6 | 23 |

FIG. 5C

| DATE | TIME | OPERATION MODE |
|---|---|---|
| 2006/12/ 4 | 9:30 | 1 |
|  | 10:12 | 2 |
|  | 10:16 | 1 |
|  | 10:46 | 3 |
| 2006/12/ 5 | 9:30 | 2 |

FIG. 5D

| STARTING DATE | FINISHING DATE | ESTIMATED TOTAL POWER VALUE | STAND-BY STATE | PRINTING STATE | POWER-SAVING STATE |
|---|---|---|---|---|---|
| 2006/12/ 4 | 2006/12/10 | 6,200wh | 3,500wh | 2,000wh | 800wh |
| 2006/12/11 | 2006/12/17 | 7,500wh | 4,000wh | 2,000wh | 1,500wh |
| 2006/12/18 | 2006/12/24 | 8,300wh | 5,000wh | 1,500wh | 1,800wh |

ILLUSTRATIONS OF INFORMATION STORED IN FLASH MEMORY OF FIRST EMBODIMENT

OPERATIONAL FLOWCHART OF CALCULATING ESTIMATED TOTAL POWER VALUE OF FIRST EMBODIMENT

FIG. 7

OPERATION FLOWCHART OF DISPLAYING ESTIMATED TOTAL POWER VALUE OF FIRST EMBODIMENT

FIG. 8

ILLUSTRATION (BAR CHART) OF DISPLAY UNIT OF SECOND EMBODIMENT

FIG. 9

BLOCK DIAGRAM SHOWING CONFIGURATION OF PRINTING APPARATUS OF SECOND EMBODIMENT

FIG. 10

| STARTING DATE | FINISHING DATE | ESTIMATED TOTAL POWER VALUE | STAND-BY | PRINTING | POWER-SAVING | NUMBER OF TIMES OF PS | NUMBER OF TIMES OF PS FOR EIGHT HOURS OR MORE |
|---|---|---|---|---|---|---|---|
| 2006/12/ 4 | 2006/12/10 | 6,200wh | 3,500wh | 2,000wh | 800wh | 41 | 7 |
| 2006/12/11 | 2006/12/17 | 7,500wh | 4,000wh | 2,000wh | 1,500wh | 47 | 7 |
| 2006/12/18 | 2006/12/24 | 8,300wh | 5,000wh | 1,500wh | 1,800wh | 52 | 7 |

ILLUSTRATION OF INFORMATION STORED IN FLASH MEMORY OF SECOND EMBODIMENT

FIG. 11

OPERATION FLOWCHART OF CALCULATING POWER-SAVING EFFECT OF SECOND EMBODIMENT

FIG. 12

OPERATION FLOWCHART OF DISPLAYING POWER-SAVING EFFECT OF SECOND EMBODIMENT

US 8,126,351 B2

PRINTING APPARATUS WITH ENERGY MANAGEMENT AND DISPLAY

CROSS REFERENCE TO RELATED APPLICATIONS

This application claims priority based on 35 USC 119 from prior Japanese Patent Application No. P2007-279077 filed on Oct. 26, 2007, the entire contents of which are incorporated herein by reference.

BACKGROUND OF THE INVENTION

1. Field of the Invention

The present invention relates to a printing apparatus that displays a power consumption value.

2. Description of Related Art

Conventionally, printing apparatuses are known that can calculate and provide users a power consumption value. For example, Japanese Patent Application Publication No. Hei 7-129042 teaches an image forming apparatus that calculates and displays a power consumption value.

On the other hand, the awareness among users and companies about environmental protection has increased with the start of the "International Energy Star Program" in 1995, "The Revised Energy Conservation Law" in 1998, and the like. As a result, there is a great demand for electronic products with reduced power consumption and that allow users to contribute to environmental protection. The International Energy Star Program is an international energy-saving program for office equipment, which is implemented in seven countries. In the International Energy Star Program, a reference formula is set for each category of products. When a printing speed is inputted in the corresponding reference formula, a standard value is determined. Meanwhile, a measured value is calculated from a standard power consumption value (KWh) in a normal operation during a certain typical period by using a typical electricity consumption (TEC) measuring method. That is, the standard value of the International Energy Star Program and a measured value obtained by the TEC measuring method are references for measuring power-saving capabilities.

However, the image forming apparatus disclosed in Japanese Patent Application Publication No. Hei 7-129042 displays only power consumption values during the past one week or the past one month. No product displays these references for measuring energy-saving capabilities. Thus, users cannot determine if displayed power consumption values are appropriate in terms of energy-saving.

SUMMARY OF THE INVENTION

An aspect of the invention provides a printing apparatus having a plurality of operation modes that comprises: a storage unit configured to store power consumption values per unit time for each operation mode and a standard power consumption value indicating an energy-saving standard power consumption during a determined period of use; an operation mode management unit configured to measure an operation time of the printing apparatus for each operation mode; a calculator configured to calculate an estimated total power consumption value during the determined period of use from measured operation time in each operation mode and from the power consumption values stored in the storage unit; and a display unit configured to display both the standard power consumption value obtained from the storage unit and the calculated estimated total power consumption value.

DETAILED DESCRIPTION OF THE EMBODIMENTS

First Embodiment

Embodiments of the invention will be described by referring to the drawings.

Figure 1:
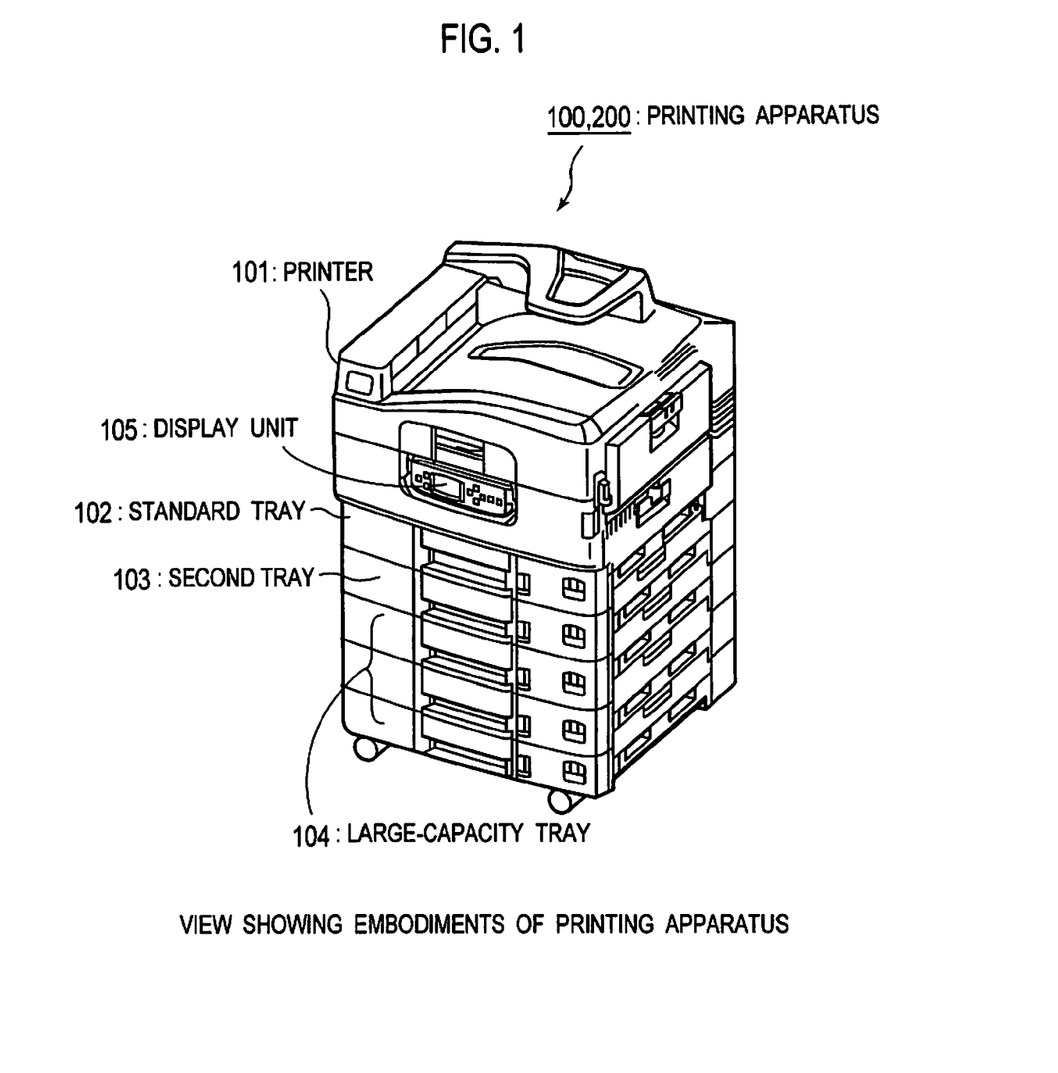
FIG. 1 shows the shape of a printing apparatus according to embodiments.

FIG. 1 is a view showing a form of a printing apparatus according to an embodiment. As shown in FIG. 1, each of printing apparatuses 100 and 200 includes printer 101, standard tray 102, second tray 103, and large-capacity tray 104. Printer 101 includes display unit 105. Here, the reference number 200 references a portion of a second embodiment that will be described in detail below.

In addition to standard tray 102, printing apparatus 100 uses second tray 103 and large-capacity tray 104 to handle a large number of documents and corresponds to an office environment in which printing is frequently performed. Since second tray 103 and large-capacity tray 104 are included, several hundreds of paper sheets can be stored. In a printing apparatus such as apparatus 100, faster printing speed is often demanded, This however, requires more power consumption. Thus, energy management is important.

Printing apparatus 100 includes several operational modes for energy-saving. The operational modes include a printing mode in which printing is being performed, a stand-by mode in which the printing apparatus is out of the printing mode and a heater is driven to keep a fixing device inside in a heat-generating state in order to prepare for a subsequent printing operation, and a power-saving mode in which the heater is stopped in order to reduce power consumption if printing demand is absent for a predetermined period after the last printing operation, and the like.

Figure 2:
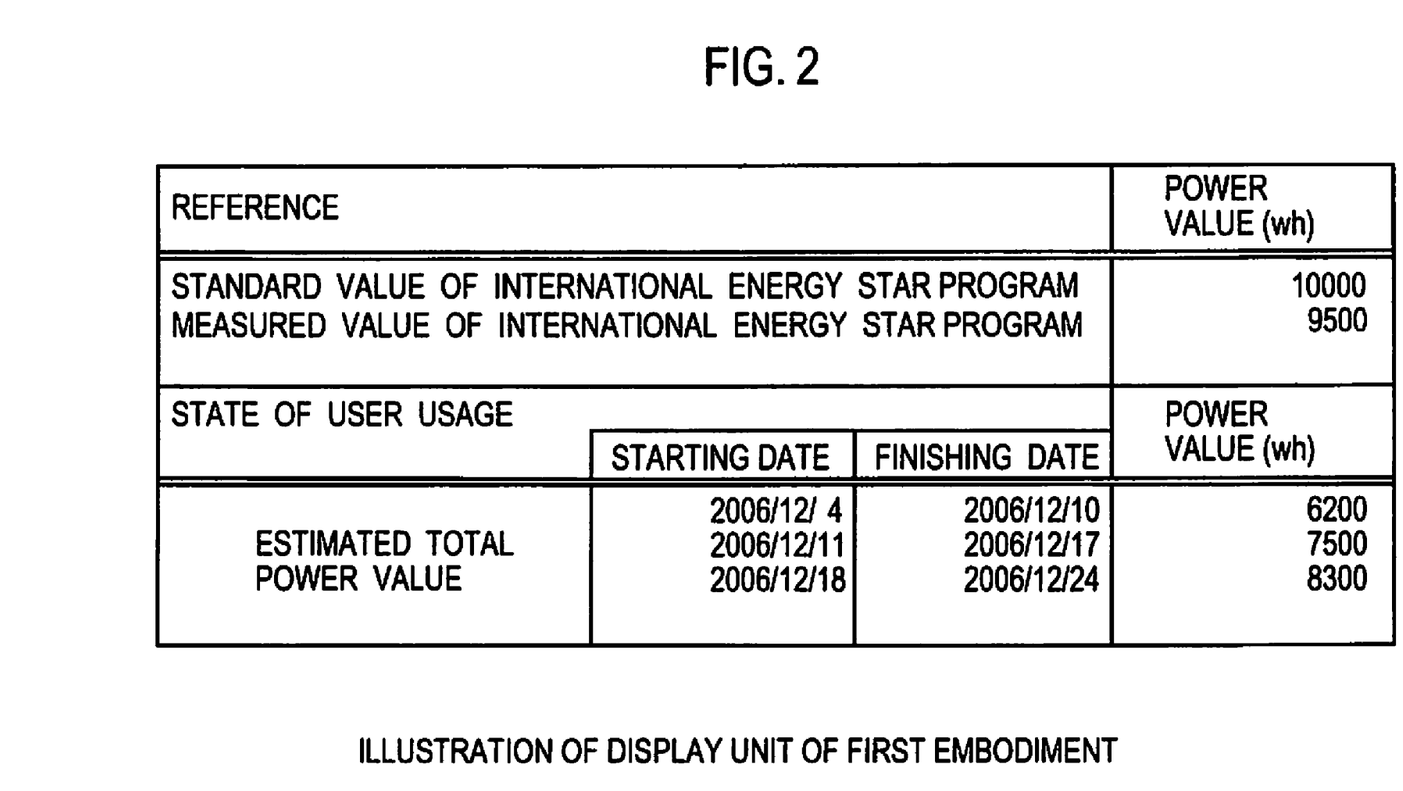
FIG. 2 illustrates a display unit according to a first embodiment.

FIG. 2 is an illustration of a display unit 105 according to the first embodiment. As shown in FIG. 2, standard and measured values of the International Energy Star Program are displayed. Therebelow, estimated total power values for each week, each of which is calculated from data collected for the past three weeks, are displayed within the same region of an integrated display device of the printing apparatus.

The standard value of the International Energy Star Program shown in FIG. 2 is "10,000 Wh." which is a total power value for a week. This standard value can be determined by classification via characteristics of an apparatus and a speed of the product. For printer example, if a size is "a standard form", a printing technique is "electrophotography", and a color function is "color", then the printer is defined as class 2. The standard value of the International Energy Star Program for class 2 is set as 6,000 (Wh) if a product speed is 20 (IPM) and as 10,000 (Wh) if a product speed is 40 (IPM). That is, the printing apparatus 100 in FIG. 1 has the standard value of "10,000 Wh" according to the International Energy Star Program and the product speed of 40 (IPM).

In contrast, the measured value of the International Energy Star Program shown in FIG. 2 is "9,500 Wh". This value was previously measured by the manufacturer of the printer 101 by using printer 101. The measured value is a power consumption value of printer 101 per week, which is calculated from normal hours of use per day, use tendency, and initial setting time to the power-saving mode. This power consumption value per week includes operation for five days, each day including long working time zones in the morning and the afternoon and a power-saving mode time zone there between. The energy-saving time zone is assumed to be lunch time. The power consumption value per week also includes non-operation for two days when the product is not used. It is assumed that the power source of the product is not cut on non-operating days.

The estimated total power value shown in the lower part of FIG. 2 shows that the estimated total power value of one week period from Dec. 4 to Dec. 10 of 2006 is "6,200 Wh", the estimated total power value of the next one week period from Dec. 11 to Dec. 17 of 2006 is "7,500 Wh", and the estimated total power value of the next one week period from Dec. 18 to Dec. 24 of 2006 is "8,300 Wh".

The standard and measured values of the International Energy Star Program are rough estimates of energy demand of the apparatus and are guidelines for proper energy management. Accordingly, the user should not exceed an amount of energy provided when using the printing apparatus. Accordingly, such action will lead to effective usage of energy and become a practical energy-saving measure.

Figure 3:
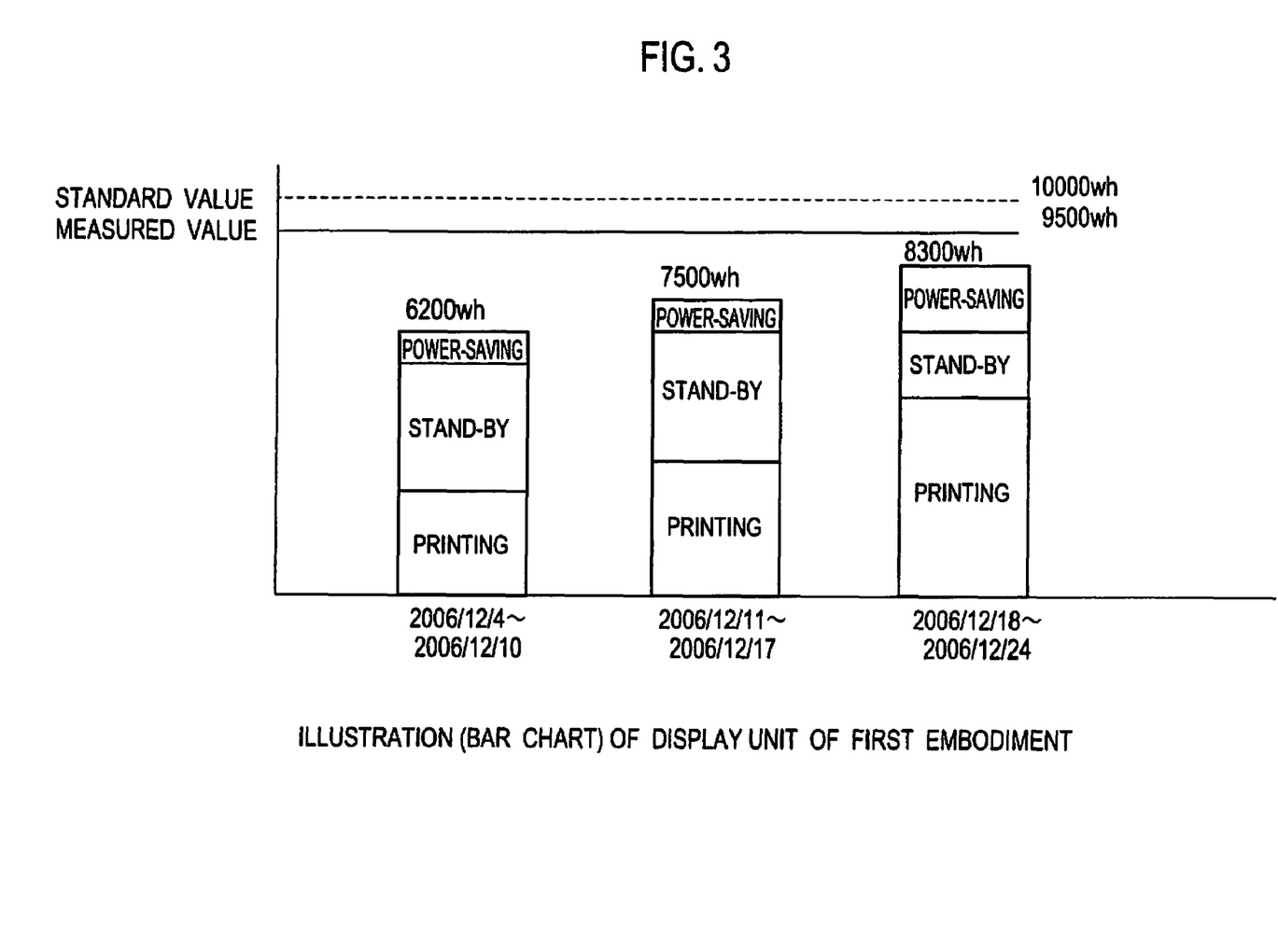
FIG. 3 illustrates a bar chart for display on the display unit according to the first embodiment.

FIG. 3 illustrates a bar chart for display on the display unit according to the first embodiment. This bar chart shows the data of FIG. 2 in the form of graphs. As shown in FIG. 3, a dotted line indicates the standard value and a solid line indicates a measured value of the International Energy Star Program. In addition, the estimated total power values in the past three weeks are shown by bar charts for each week. Each of the bar charts is formed by accumulations of the power consumption values in the respective printing, stand-by, and power-saving modes. By displaying the estimated total power values in the past three weeks with the standard and measured values of the International Energy Star Program, the user can know the tendency of power consumption of printing apparatus 100. Thereby, the user clearly can check if an estimated total power value exceeds the standard value and the measured value of the International Energy Star Program.

Figure 4:
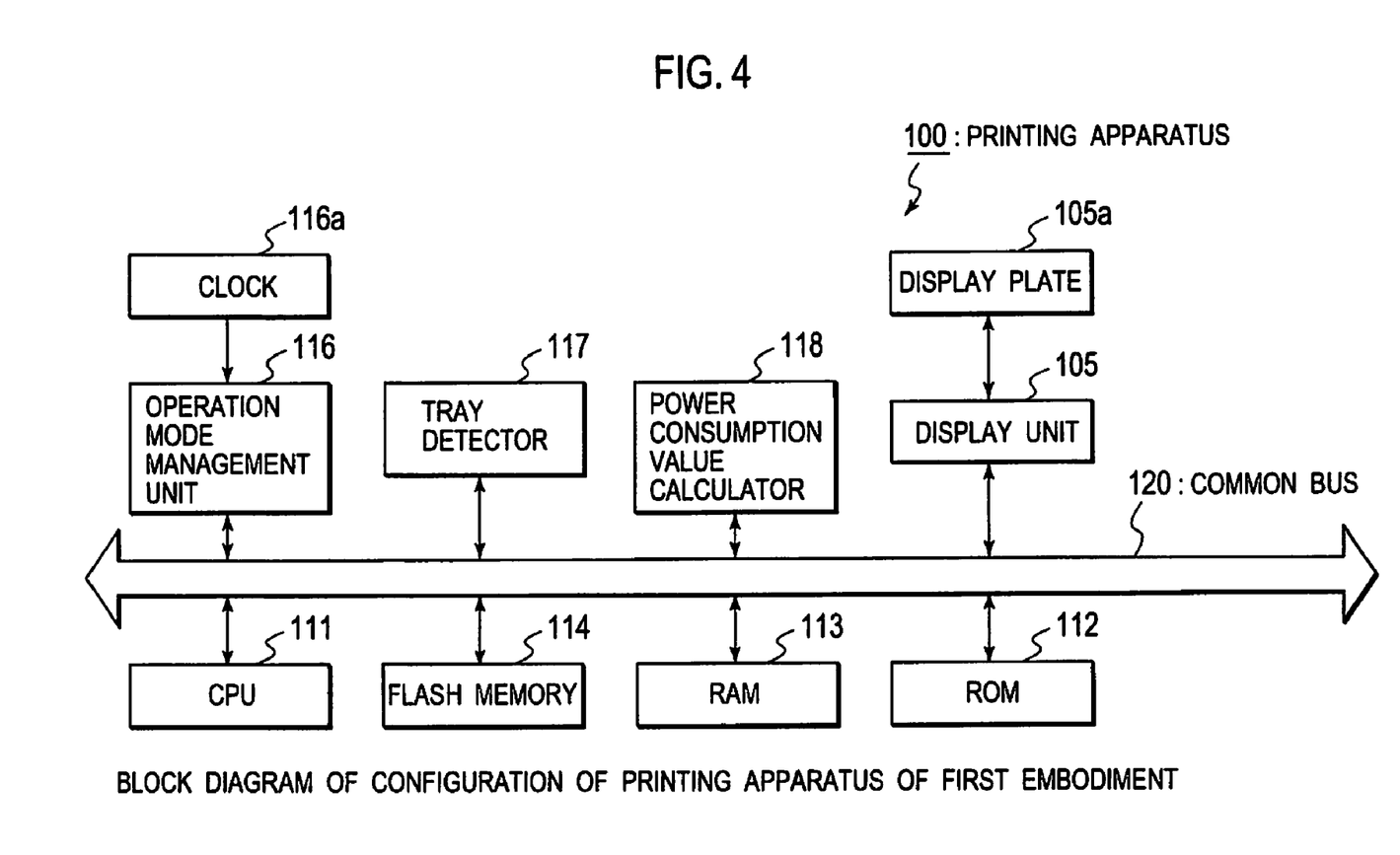
FIG. 4 is a block diagram showing a configuration of the printing apparatus according to the first embodiment.

FIG. 4 is a block diagram showing the configuration of printing apparatus 100 according to the first embodiment. As shown in FIG. 4, printing apparatus 100 includes display unit 105, CPU 111, ROM 112, RAM 113, FLASH memory 114, operation mode management unit 116, tray detector 117, power consumption value calculator 118, and common bus 120.

Display unit 105 has display plate 105a, and is configured to read out predetermined information from FLASH memory 114 and to display the predetermined information in a predetermined form on display plate 105a. The predetermined information includes the standard value and the measured value of the International Energy Star Program, the estimated total power value, and the like.

CPU 111 is a microcomputer configured to carry out each function of printing apparatus 100 by executing a control program stored in ROM 112. CPU 111 controls each unit in accordance with various functions.

Read only memory (ROM) 112 stores predetermined control programs for controlling printing apparatus 100. This ROM 112 is a non-volatile memory in which the stored contents are held even when power to printing apparatus 100 is shut down.

Random access memory (RAM) 113 provides an arithmetic region required by CPU 111 for executing control programs. Since RAM 113 is a volatile memory, data stored inside thereof are erased by power shutdown.

FLASH memory 114 stores in advance, the standard and measured values of the International Energy Star Program and the power consumption values for the respective operation modes. FLASH memory 114 also stores the estimated total power value per week, which shows usage status of printing apparatus 100, the respective modes used for calculating the estimated total power values, and the elapsed times of the respective modes.

Operation mode manager 116 has clock 116a and is configured to determine each operation mode in response to the operation of printing apparatus 100. Operation mode manager 116 acquires time and date from clock 116a by setting or clearing a flag corresponding to the operation mode every time the operation mode changes, and stores the time and date and the operation mode at that time in FLASH memory 114.

Here, the flag is used for determining the operation mode of printing apparatus 100. The flag is stored in a flag storage. CPU 111 accesses the flag stored in the flag storage as needed by executing the above-described control programs. The flag storage may be provided in temporal storage provided inside CPU 111, RAM 113, or the like.

Tray detector 117 is configured to detect if a second tray and a large-capacity tray are mounted on printing apparatus 100 for a large amount of printing.

Power consumption value calculator 118 is configured to acquire an elapsed time in each operation mode of printing apparatus 100 from the information of the time and date and for each operation mode which is stored in FLASH memory 114 and calculates the estimated total power value per week.

Figure 5A:
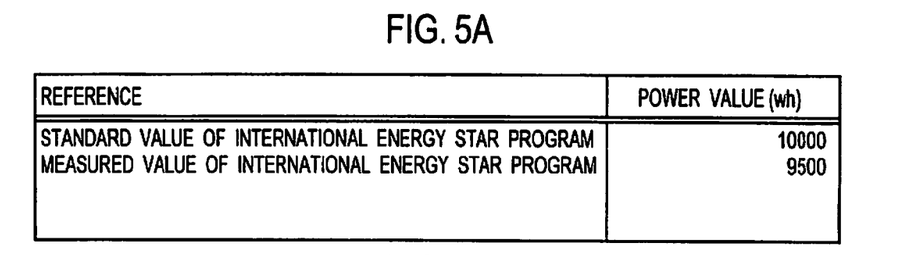
FIGS. 5A to 5D illustrate information stored in a FLASH memory according to the first embodiment.

FIGS. 5A to 5D illustrate information stored in FLASH memory 114 according to the first embodiment. FIG. 5A shows the standard value of the International Energy Star Program and the measured value measured by the manufacturer, which are stored in FLASH memory 114 according to the first embodiment. As shown in FIG. 5A, the standard value of this printing apparatus 100 is 10,000 Wh and its measured value is 9,500 Wh.

Figure 5B:
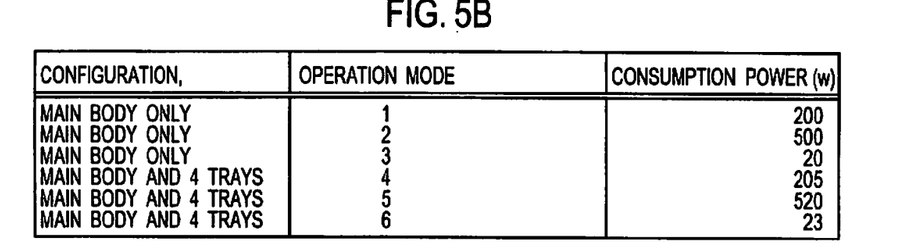

FIG. 5B is a table of the power consumption values extracted from the relationship between each operation mode and device configuration, which are stored in FLASH memory 114, according to the first embodiment. The device configuration includes two kinds. One is "main body only" when only a standard tray is mounted on printing apparatus

100. The other is "main body and 4 trays" when a second tray and a large-capacity tray are added to printing apparatus 100.

The table of the power consumption values includes six kinds of states. Operation mode 1 is a stand-by mode for an apparatus configuration of "main body only". Operation mode 2 is a printing mode for an apparatus configuration of "main body only". Operation mode 3 is a power-saving mode for an apparatus configuration of "main body only". Operation mode 4 is a stand-by mode for an apparatus configuration of "main body and four (4) trays 103 and 104". Operation mode 5 is a printing mode for an apparatus configuration of "main body and four (4) trays 103 and 104. Operation mode 6 is a power-saving mode for an apparatus configuration of "main body and four (4) trays 103 and 104".

As shown in FIG. 5B, the power consumption value of "main body and four (4) trays 103 and 104" is slightly larger than that of "main body only". When compared in the embodiments of operation modes 2 and 5, the power consumption value of "main body only" is 500 W, while the power consumption value of "main body and four (4) trays 103 and 104" is 520 W.

Figure 5C:
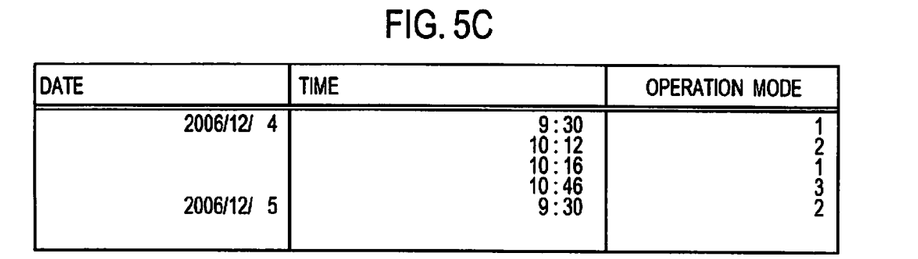

FIG. 5C depicts a time management (mode history) table stored in FLASH memory 114 according to the first embodiment. In the FLASH memory, "date", "time", and "operation mode" are recorded, and an elapsed time of each operation mode in printing apparatus 100 is acquired from the information. Then, the estimated total power value is calculated.

Figure 5D:
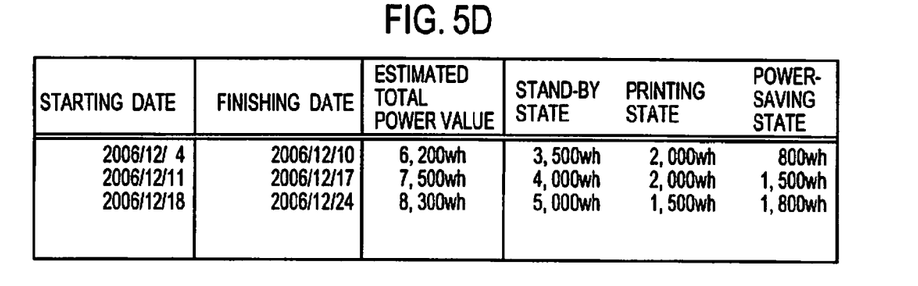

FIG. 5D shows the estimated total power values stored in FLASH memory 114, according to the first embodiment. In FLASH memory 114, the estimated total power values per week are recorded for the past three weeks and the power consumption values in the respective operation modes are also recorded as breakdowns of the estimated total power values.

Figure 6:
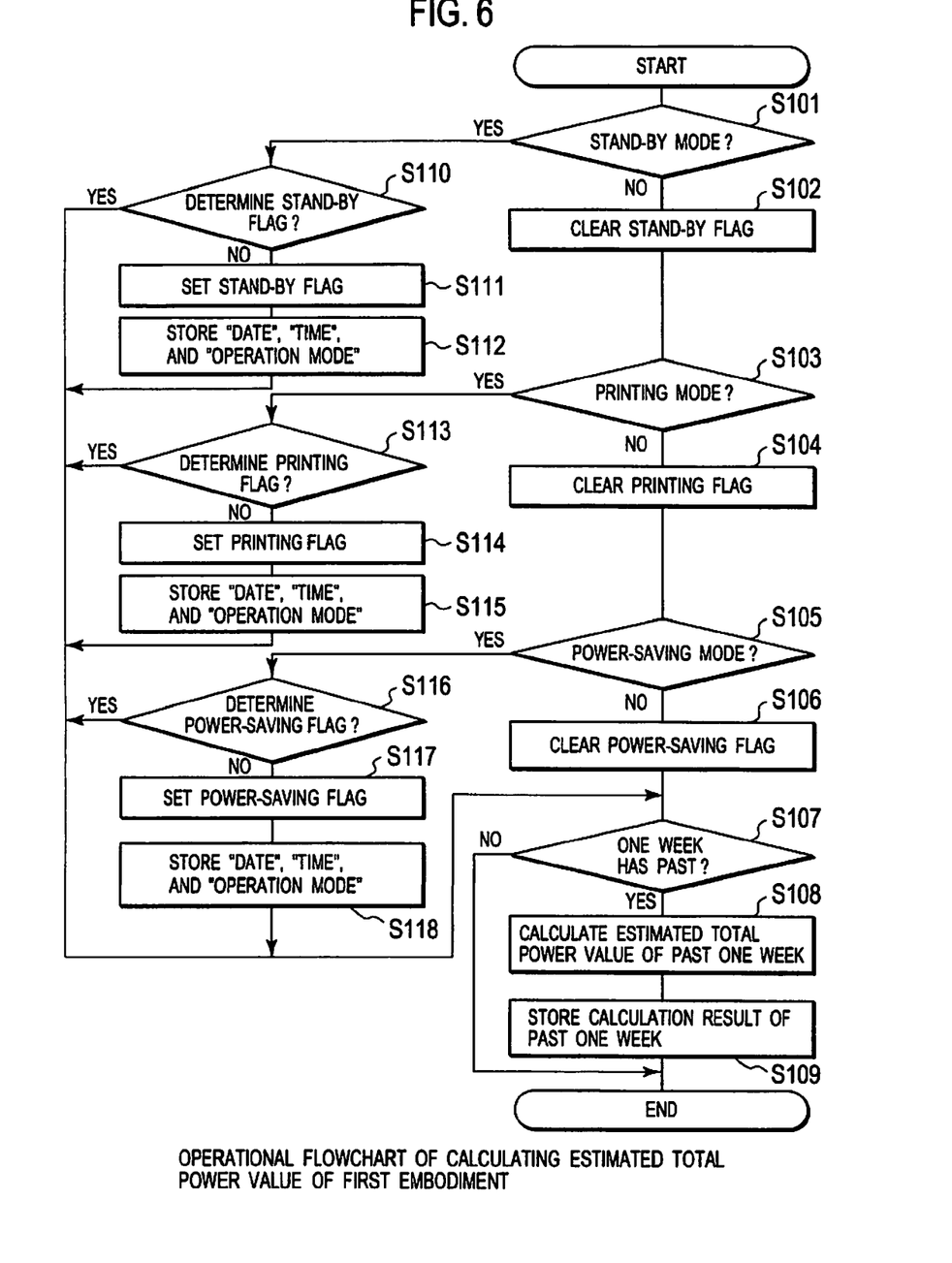
FIG. 6 is an operational flowchart for calculating an estimated total power value according to the first embodiment.

FIG. 6 is an operational flowchart showing calculations of the estimated total power value, according to the first embodiment. The processing flow from steps S101 to S121 will be sequentially described according to the flowchart shown in FIG. 6. The following steps are repeatedly carried out at a predetermined interval (for example, every second) starting from the time that the printing apparatus 100 is tuned on, as performing a polling process. Thereby, the estimatedtotal power value per week is calculated.

(Step S101)

Operation mode management unit 116 determines if printing apparatus 100 is in a stand-by mode. If printing apparatus 100 is in a stand-by mode, the step proceeds to step S110 and if not, the step proceeds to step S102.

(Step S102)

Operation mode management unit 116 clears a stand-by flag because printing apparatus 100 is not in a stand-by mode. If the stand-by flag has been already cleared, the state is maintained.

(Step S103)

Operation mode management unit 116 determines if printing apparatus 100 is in a printing mode. If printing apparatus 100 is in a printing mode, the step proceeds to step S113 and if not, the step proceeds to step S104.

(Step S104)

Operation mode management unit 116 clears a printing flag because printing apparatus 100 is not in a printing mode. If the printing flag has been already cleared, the state is maintained.

(Step S105)

Operation mode management unit 116 determines if printing apparatus 100 is in a power-saving mode. If printing apparatus 100 is in a power-saving mode, the step proceeds to step S116 and if not, the step proceeds to step S106.

(Step S106)

Operation mode management unit 116 clears a power-saving flag because printing apparatus 100 is not in a power-saving mode. If the power-saving flag has been already cleared, the state is maintained.

(Step S107)

Operation mode management unit 116 determines if one week has passed, for which an estimated total power value is to be calculated by printing apparatus 100. If one week has passed, the step proceeds to step S108, and if not, the operation for calculating the estimated total power value per week is completed.

(Step S108)

Operation mode management unit 116 calculates an accumulated time for each operation mode by using the time management table for the past one week, which is stored in FLASH memory 114, because the one week for which the estimated total power value is to be calculated has passed. Then, power consumption value calculator 118 multiplies the calculated accumulated time by the power consumption value of each operation mode to calculate an estimated total power value.

(Step S109)

Power consumption value calculator 118 stores the calculated estimated total power value in FLASH memory 114 and terminates the operation.

(Step S110)

Operation mode management unit 116 determines if a stand-by flag is set. If the stand-by flag is set, the step proceeds to step S107, and if not, it is determined that there is a change of the operation mode state. Then, the step proceeds to step S111.

(Step S111)

Operation mode management unit 116 sets the stand-by flag.

(Step S112)

Operation mode management unit 116 determines that the operation mode state is changed, and acquires current "date" and "time" from clock 116a. Operation mode management unit 116 stores information that the operation mode is in "stand-by mode," and the information of the acquired current "date" and "time" in the time management table in FLASH memory 114. Thereafter, the step proceeds to S107.

(Step S113)

Operation mode management unit 116 determines if a printing flag is set. If the printing flag is set, the step proceeds to step S107, and if not, it is determined that there is a change of the operation mode state. Then, the step proceeds to step S114.

(Step S114)

Operation mode management unit 116 sets the printing flag.

(Step S115)

Operation mode management unit 116 determines that the operation mode state is changed, and acquires current "date" and "time" from clock 116a. Operation mode management unit 116 stores information that the operation is in "printing mode" and the information of the acquired current "date" and "time" in the time management table in FLASH memory 114.

(Step S116)

Operation mode management unit 116 determines if a power-saving flag is set. If the power-saving flag is set, the step proceeds to step S107, and if not, it is determined that there is a change of the operation mode state. Then, the step proceeds to step S117.

(Step S117)

Operation mode management unit 116 sets the power-saving flag.

(Step S118)

Operation mode management unit 116 determines that the operation mode state is changed, and acquires current "date" and "time" from clock 116a. Operation mode management unit 116 stores information that the operation mode is in "power-saving mode" and the information of the acquired current "date" and "time" in the time management table in FLASH memory 114.

As described above, printing apparatus 100 can calculate the estimated total power value by always monitoring changes in the operation mode.

Figure 7:
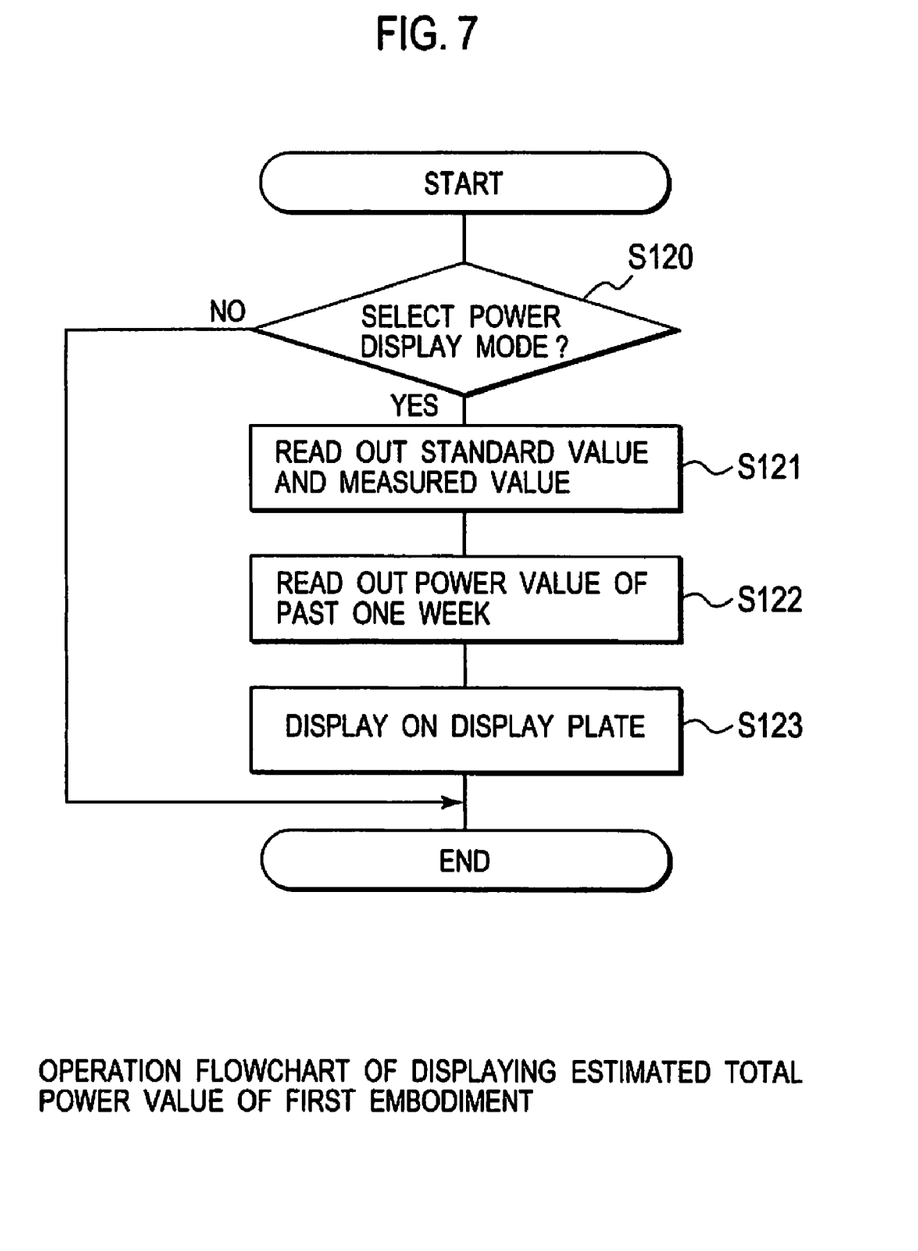
FIG. 7 is an operational flowchart for displaying the estimated total power value according to the first embodiment.

FIG. 7 is an operational flowchart that displays the estimated total power value, according to the first embodiment. The processing flow from steps S120 to S123 will be sequentially described according to the flowchart shown in FIG. 7.

(Step S120)

If a user selects "power display mode designation" in an unillustrated operation unit of printing apparatus 100, then the step proceeds to step S121. If a user does not make this selection, the operation is completed. Namely, when the user does not desire to display the standard and measured values of the International Energy Star Program and the estimated power consumption in operation, these values are not displayed in the display unit 105.

(Step S121)

Display unit 105 reads the standard and measured values of the International Energy Star Program from FLASH memory 114.

(Step S122)

Display unit 105 reads the estimated total power values for the past three weeks from FLASH memory 114.

(Step S123)

Display unit 105 displays, on display plate 105a, the standard and measured values of the International Energy Star Program and the estimated total power values for the past three weeks. The initial setting of the display may be in table or bar chart formats. The initial setting of the display may also be selectable for users' preference.

As described above, in the first embodiment, both of the standard and measured values of the International Energy Star Program and the estimated total power consumption in operation are displayed together on the display unit 105 of a printing apparatus that has a power consumption calculation function. Thereby, a reference to the power consumption of the apparatus becomes clear to user. Thus, the user can determine if the consumed amount of energy is appropriate by displaying those values together.

Second Embodiment

The embodiment achieves a printing apparatus 200 capable of requesting users to practice the energy-saving activity and contribute to environmental protection by displaying power-saving effect achieved by: shortening a transition time to the power-saving mode when power used by the apparatus exceeds the measured value of the International Energy Star Program; or displaying power-saving effects of turning off the power during an unused time zone at nighttime.

In the following, the power-saving effects achieved from shortening the transition time to the power-saving mode, and from turning off power during the unused night time zone will be described.

Figure 8:
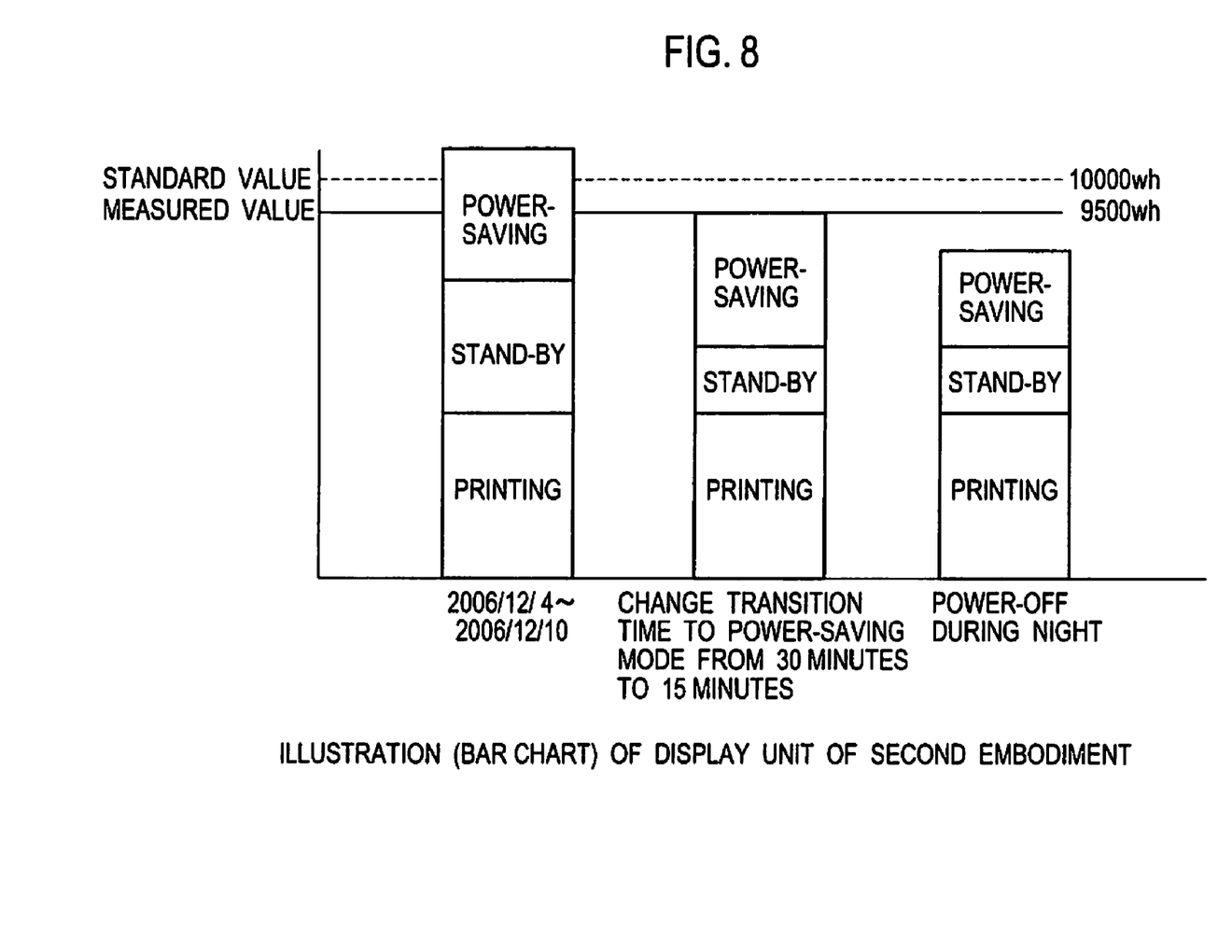
FIG. 8 shows a bar chart for display on a display unit according to a second embodiment.

FIG. 8 shows a bar chart to be displayed on a display unit 105 according to a second embodiment. FIG. 8 is a bar chart that shows when an estimated total power value for the past one week exceeds the standard value or measured value of the International Energy Star Program, how much power consumption value could be saved if any kind of power-saving measure is taken.

In FIG. 8, considerable power-saving effects are shown in both cases wherein the transition time from the stand-by mode to the power-saving mode is changed from 30 minutes to 15 minutes and wherein power is turned off during the night. The printing apparatus 200 according to this embodiment, which can display power-saving effects, will be configured as follows.

Figure 9:
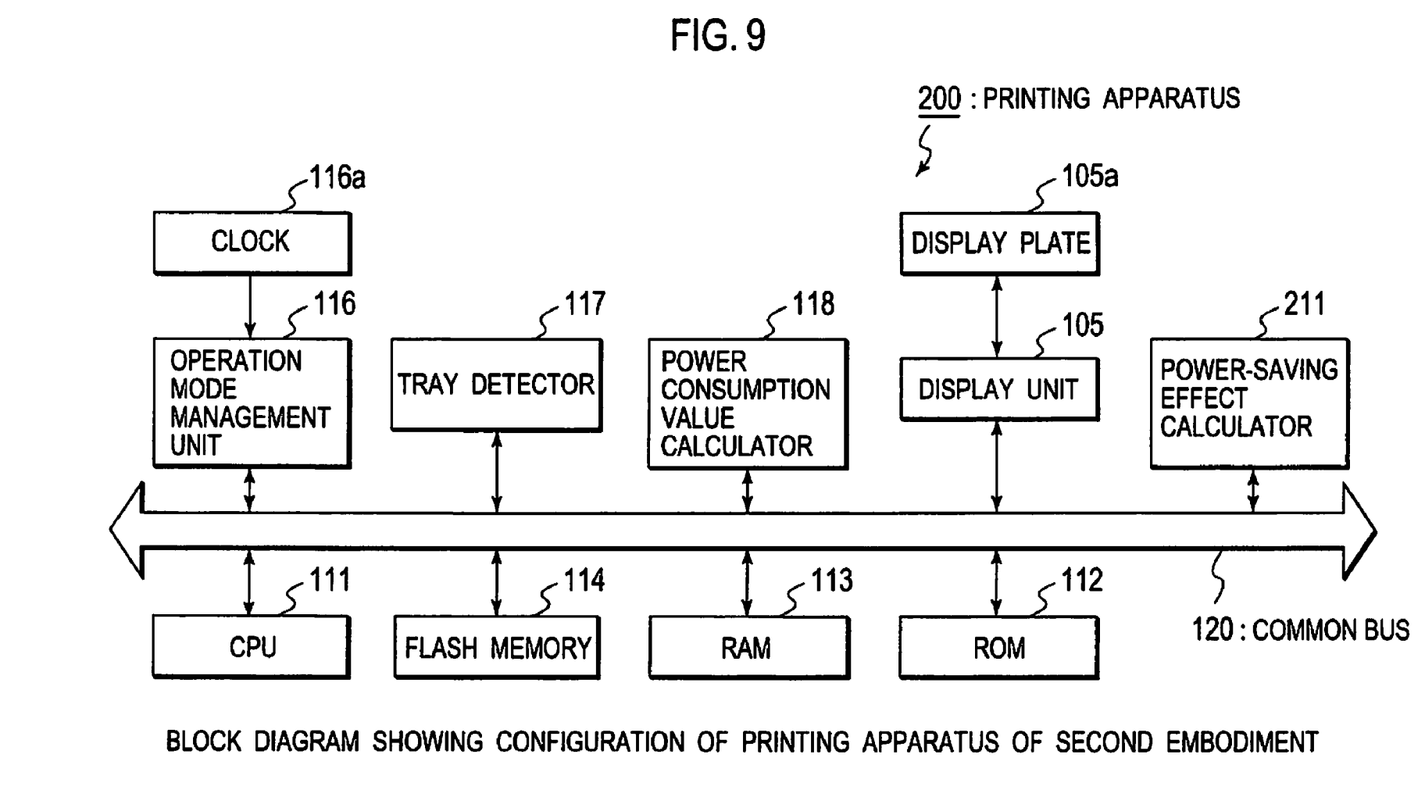
FIG. 9 is a block diagram showing the configuration of a printing apparatus according to the second embodiment.

FIG. 9 is a block diagram showing the configuration of the printing apparatus 200, according to the second embodiment. As shown in FIG. 9, printing apparatus 200 includes display unit 105, CPU 111, ROM 112, RAM 113, FLASH memory 114, operation mode management unit 116, tray detector 117, power consumption value calculator 118, power-saving effect calculator 211, and common bus 120.

The printing apparatus 200 of the second embodiment is different from that of the first embodiment only in that power-saving effect calculator 211 is added and information stored in FLASH memory 114 is different. In the following, only the different points will be described in detail, and description of portions common to those of the first embodiment will be omitted.

Power-saving effect calculator 211 is a unit configured to calculate, with regard to an estimated total power value for the past one week, a power consumption value to be saved if a transition time from a stand-by mode to a power-saving mode is shortened and if power is turned off during the power-saving mode, which is eight hours or more.

Figure 10:
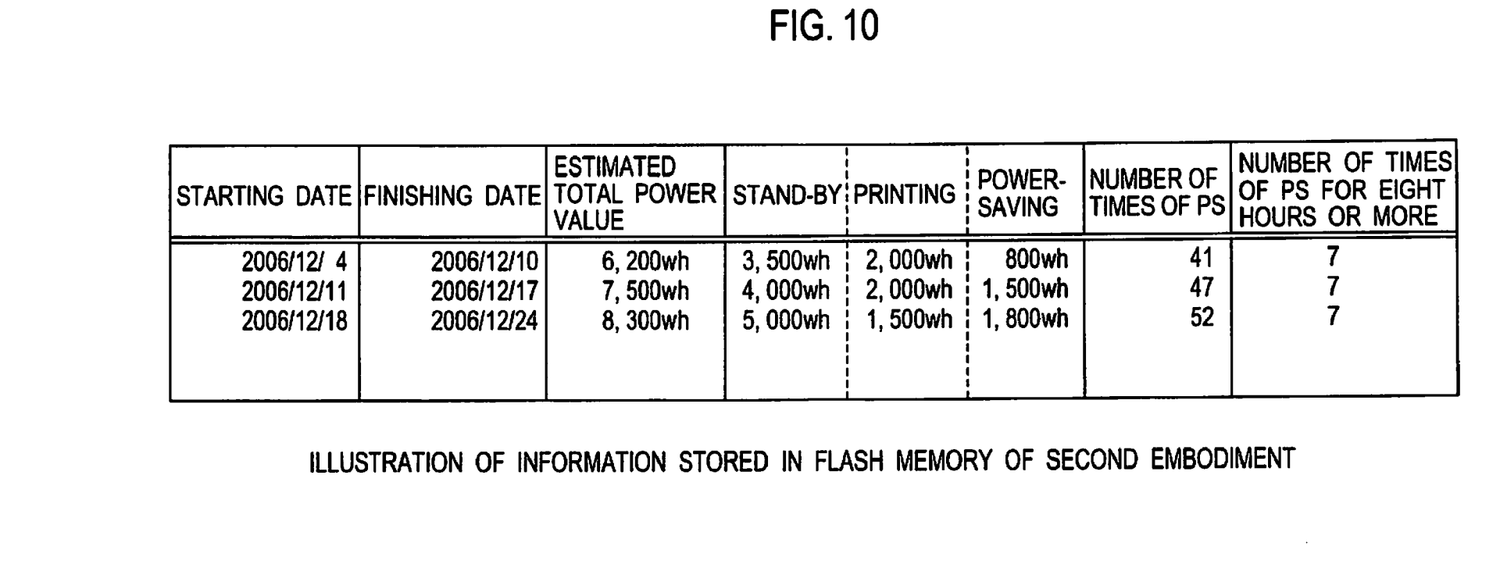
FIG. 10 illustrates information stored in a FLASH memory according to the second embodiment.

FIG. 10 illustrates information stored in FLASH memory 114 according to the second embodiment. As shown in FIG. 10, FLASH memory 114 records the estimated total power values per week for the past three weeks. The power consumption values in the respective operation modes are also recorded as breakdowns of the estimated total power values. In addition, the number of transitions to the power-saving (PS) mode and the number of the power-saving mode state (of eight hours or more), assumed here as an unused time zone during the night, are recorded. The information is stored in FLASH memory 114 in addition to the information in FIG. 5 as described in the first embodiment.

Figure 11:
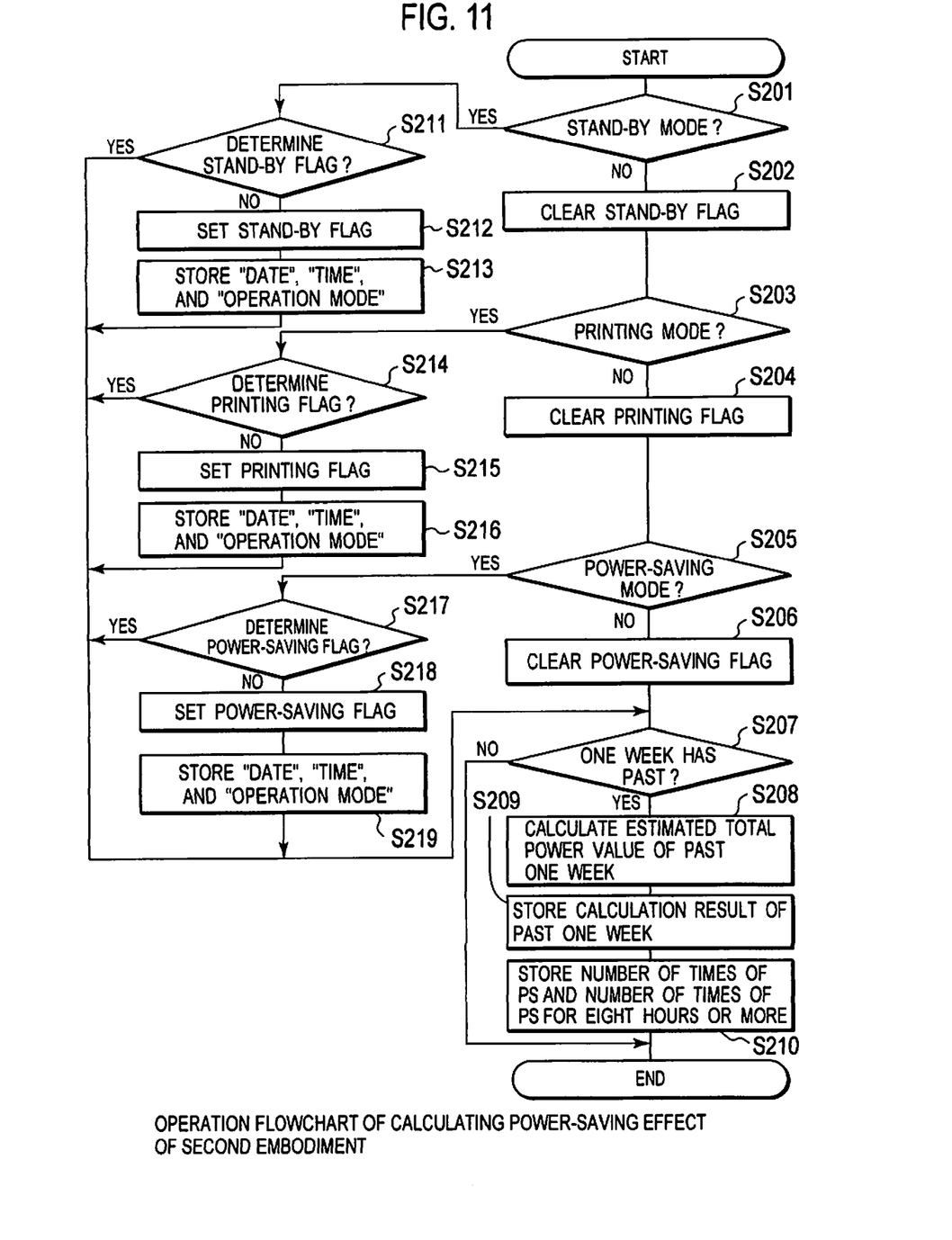
FIG. 11 is an operational flowchart for calculating a power-saving effect according to the second embodiment.

Printing apparatus 200 according to the second embodiment operates as follows. FIG. 11 is an operational flowchart for calculating a power-saving effect, according to the second embodiment. The processing flow from steps S201 to S219 will be sequentially described according to the flowchart shown in FIG. 11. The following steps are repeatedly carried out as performing a polling process, so as to calculate the number of transitions from the stand-by mode to the power-saving mode per week and the number of uses of the power-saving mode state of eight hours or more.

(Step S201)

Operation mode management unit 116 determines if printing apparatus 200 is in a stand-by mode. If printing apparatus 200 is in a stand-by mode, the step proceeds to step S211 and if not, the step proceeds to step S202.

(Step S202)

Operation mode management unit 116 clears a stand-by flag because printing apparatus 200 is not in a stand-by mode. If the stand-by flag has been already cleared, the state is maintained.

(Step S203)

Operation mode management unit 116 determines if printing apparatus 200 is in a printing mode. If printing apparatus 200 is in a printing mode, the step proceeds to step S214 and if not, the step proceeds to step S204.

(Step S204)

Operation mode management unit 116 clears a printing flag because printing apparatus 200 is not in a printing mode. If the printing flag has been already cleared, the state is maintained.

(Step S205)

Operation mode management unit 116 determines if printing apparatus 200 is in a power-saving mode. If printing apparatus 200 is in a power-saving mode, the step proceeds to step S217 and if not, the step proceeds to step S206.

(Step S206)

Operation mode management unit 116 clears a power-saving flag because printing apparatus 200 is not in a power-saving mode. If the power-saving flag has been already cleared, the state is maintained.

(Step S207)

Operation mode management unit 116 determines if one week has passed since the last calculation of the estimated total power value. If one week has passed, the step proceeds to step S208, and if not, the operation for calculating the estimated total power value per week is completed.

(Step S208)

Operation mode management unit 116 calculates accumulated time of each operation mode by using the time management table for the past one week, which is stored in FLASH memory 114 because one week has passed. Then, power consumption value calculator 118 multiplies the calculated accumulated time by the power consumption value of each operation mode to calculate the estimated total power value.

(Step S209)

Power consumption value calculator 118 stores the calculated estimated total power value in FLASH memory 114.

(Step S210)

Operation mode management unit 116 stores the number of transitions to the power-saving mode for the past one week and the number of the power-saving mode state of eight hours or more in FLASH memory 114. Then, the operation is completed.

(Step S211)

Operation mode management unit 116 determines if a stand-by flag is set. If the stand-by flag is set, the step proceeds to step S207, and if not, it is determined that there is a change of the operation mode state. Then, the step proceeds to step S212.

(Step S212)

Operation mode management unit 116 sets the stand-by flag.

(Step S213)

Operation mode management unit 116 determines that the operation mode state is changed, and acquires current "date" and "time" from clock 116a. Operation mode management unit 116 stores the data that the operation mode is in "stand-by mode" and the information of the acquired current "date" and "time" in the time management table in FLASH memory 114. Thereafter, the step proceeds to S207.

(Step S214)

Operation mode management unit 116 determines if a printing flag is set. If the printing flag is set, the step proceeds to step S207, and if not, it is determined that there is a change of the operation mode state. Then, the step proceeds to step S215.

(Step S215)

Operation mode management unit 116 sets the printing flag.

(Step S216)

Operation mode management unit 116 determines that the operation mode state is changed, and acquires current "date" and "time" from clock 116a. Operation mode management unit 116 stores information that the operation mode is in "printing mode" and the information of the acquired current "date" and "time" in the time management table in FLASH memory 114.

(Step S217)

Operation mode management unit 116 determines if a power-saving flag is set. If the power-saving flag is set, the step proceeds to step S207, and if not, it is determined that there is a change of the operation mode state, and then the step proceeds to step S218.

(Step S218)

Operation mode management unit 116 sets the power-saving flag.

(Step S219)

Operation mode management unit 116 determines that the operation mode state is changed, and acquires current "date" and "time" from clock 116a. Operation mode management unit 116 stores information that the operation mode is in "power-saving mode" and the information of the acquired current "date" and "time" in the time management table in FLASH memory 114.

Figure 12:
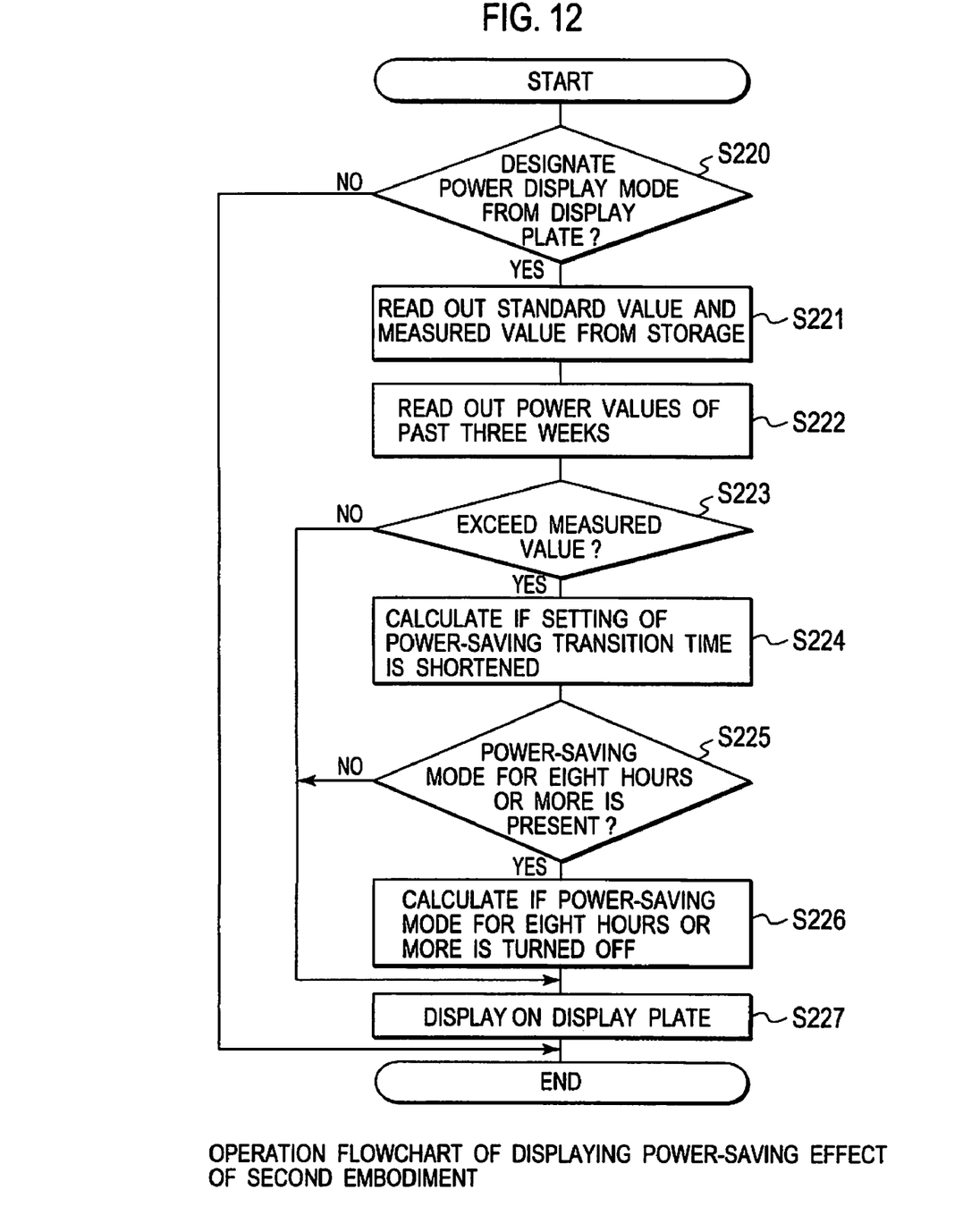
FIG. 12 is an operational flowchart for displaying the power-saving effect according to the second embodiment.

FIG. 12 is an operational flowchart regarding display of the power-saving effect, according to the second embodiment. The processing flow from steps S220 to S227 will be sequentially described according to the flowchart shown in FIG. 12.

(Step S220)

If a user selects "power display mode designation" in the unillustrated operation unit of printing apparatus 200, the step proceeds to step S221. If the user does not select it, the operation is completed. As well as the operation described in the first embodiment, when the user does not desire to display the standard and measured values of the International Energy Star Program and the estimated power consumption in operation, they are not displayed in the display unit 105.

(Step S221)

Display unit 105 reads out the standard and measured values of the International Energy Star Program from FLASH memory 114.

(Step S222)

Display unit 105 reads out the estimated total power value for the past three weeks from FLASH memory 114.

(Step S223)

Display unit 105 compares the estimated total power value for the current one week of the past three weeks with the measured value of the International Energy Star Program. If the estimated total power value during one week is larger than the measured value of the International Energy Star Program, then the step proceeds to step S224. However, if it is smaller, the step proceeds to step S227.

(Step S224)

Power-saving calculator 211 reads out the number of transitions to the power-saving mode during the past one week from FLASH memory 114 and calculates the estimated total power value if the transition time to the power-saving mode is shortened. For example, when the stand-by mode is transitioned to the power-saving mode after 30 minutes in an initial setting, the calculation is made wherein the transition is carried out after 15 minutes, which is half of the initial setting. If the number of transitions to the power-saving mode is 52 times during the past one week, 52×15=780 (minutes) of the stand-by mode can be now calculated as the power-saving mode. In other words, the stand-by mode, which has a large power consumption value, is shortened by 780 minutes and the power-saving mode, which has a smaller power consumption value, is prolonged by 780 minutes.

Note that, the estimated total power value may be calculated by flexibly shortening the transition time from the stand-by mode to the power-saving mode in relation to the initial setting time. In other words, the transition time can be set to any period based on the user's choice.

(Step S225)

Furthermore, power-saving effect calculator 211 reads out the number of events of power-saving mode of eight hours or more for the past one week from FLASH memory 114. If the number of events of power-saving mode of eight hours or more is zero, the step proceeds to step S227. If it is not zero, the step proceeds to step S226.

(Step S226)

Power-saving effect calculator 211 calculates the estimated total power value on an assumption that the power is turned off during the period of the power-saving mode for eight hours or more if the number of the power-saving mode of eight hours or more is not zero. For example, assume that the number of the power-saving mode of eight hours is seven. Then, the estimated total power value expected if the power is turned off for 8×7=56 (hours) can be calculated. If the power is turned off, the power is hardly consumed. Thus, the power consumption value for 56 hours of power-saving mode is substantially reduced.

(Step S227)

If the estimated total power value for the past one week exceeds the measured value of the International Energy Star Program, display unit 105 displays, on display plate 105a in the form of a bar chart, the estimated total power value for the past one week, the estimated total power value if the transition time to the power-saving mode is shortened, and the estimated total power value if the power-saving mode of eight hours or more is switched to the case where the power is turned off. In addition, if the estimated total power value does not exceed the measured value of the International Energy Star Program, display unit 105 displays the standard and measured values of the International Energy Star Program and the estimated total power values for the past three weeks as shown in the first embodiment in the form of a table of FIG. 2 or in the form of a bar chart of FIG. 3.

Note that in the first and second embodiments, three kinds of operation modes: "stand-by mode", "printing mode", and "power-saving mode" and two kinds components" "only apparatus body" and "apparatus body plus four-level trays" are used in a table with related power consumption values for calculating estimated total power value. By calculating the power consumption value depending on different AC input power sources and by calculating the power consumption value from preparing a table depending on various options, the estimated total power value can be more accurately calculated.

As described above, in the second embodiment, in addition to the all benefits obtained in the first embodiment, by displaying that the transition time to the power-saving mode is shortened when the printing apparatus is used by exceeding the measured value of the International Energy Star Program, or by displaying power-saving effects obtained by turning off the power during an unused time zone in the night, users can realize energy-saving measures and contribute to environmental protection.

The first and second embodiments describe application of the invention to a printing apparatus. The invention also is applicable to an image forming apparatus, such as a copier, facsimile, and a printing apparatus.

In addition, the first and second embodiments describe the calculation and display of estimated total power value. Also, the invention may display an emission amount of $CO_2$ or an electricity rate calculated from the estimated total power value.

Note that, the first and second embodiments describe display of the standard and measured values of the International Energy Star Program. Also, the invention may display the numbers of total printing jobs and total printing during one week as specified by the International Energy Star Program, and the numbers of jobs and total printing during one week recorded in the printing apparatus.

Furthermore, the first and second embodiments describe the display of the specific and measured values of the International Energy Star Program. Also, explanation of specifications of the International Energy Star Program and the like may be additionally displayed on the display unit.

The first and second embodiments describe display on a display unit the standard and measured values of the International Energy Star Program. Also, these may be printed out on a medium.

In addition, when the printing apparatus according to the first and second embodiments is connected to a PC through a LAN, the above-described display contents can be displayed on a web screen by inputting an IP address of the printing apparatus into a web browser of the PC.

As described in the above embodiments, printing apparatuses are provided that allow users to determine if a power consumption value is appropriate in terms of energy-saving by displaying standard and measured values of the International Energy Star Program in the printing apparatus, which displays power consumption values.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A printing apparatus having a plurality of operation modes, comprising:
   a storage unit configured to store power consumption values per unit time for each operation mode and a standard power consumption value during a determined period of use;
   an operation mode management unit configured to measure an operation time of the printing apparatus for each operation mode;
   a calculator configured to calculate an estimated total power consumption value during the determined period of use from measured operation time in each operation mode and from the power consumption values stored in the storage unit; and
   a display unit configured to display both of the standard power consumption value obtained from the storage unit and the calculated estimated total power consumption value.

2. The apparatus of claim 1, wherein the operation mode management unit detects an operation mode of the printing apparatus, acquires an operation time for the detected operating mode, and associatively stores the operation mode and the operation time in the storage unit.

3. The apparatus of claim 1, wherein the plurality of operation modes comprises:

a printing mode;

a stand-by mode wherein a heater in the printing apparatus is activated in preparation for printing in the printing mode; and a power-saving mode that corresponds to a time period when the printing apparatus is not operating in the printing mode or the stand-by mode.

4. The apparatus of claim 3, wherein the storage unit comprises:

a power consumption value per unit time for the printing mode;

a power consumption value per unit time for the stand-by mode;

a power consumption value per unit time for the power-saving mode; and a standard power consumption value for the apparatus in the energy-saving standard for a given mode.

5. The apparatus of claim 1, wherein the calculator compares the total power consumption value during the determined period of use with the standard power consumption value determined from the energy-saving standard, and wherein:

if the total power consumption value exceeds the standard power consumption value, the calculator calculates an estimated total power consumption value expected if a power-saving measure were followed, and the display unit indicates the estimated total power consumption value expected during the determined period of use if the power-saving measure were implemented.

6. The apparatus of claim 4, wherein the storage unit stores a standard power consumption value for the apparatus in the energy-saving standard for each of the modes.

7. The apparatus of claim 3, wherein the printing, stand-by and power saving modes comprise all of the operation time for the printer.

8. The apparatus of claim 1, wherein each determined period of use is the time of an operation mode.

9. The apparatus of claim 5, wherein the display unit further indicates the standard power consumption value and estimated total power consumption value.

10. The apparatus of claim 1, wherein the display unit is formed in a single integral unit whereby both the standard power consumption value and the estimated total power consumption value are presented in the same display.

11. The apparatus of claim 1, wherein the display unit displays the standard power consumption value and the estimated total power consumption value in response to a display request.

12. The apparatus of claim 5, wherein the power-saving measure is changed by shortening a transition time to one of the operation modes.

13. The apparatus of claim 5, wherein the operation modes include a power saving mode wherein the heater is stopped for a predetermined period after a printing operation.

14. The apparatus of claim 5, wherein the power-saving measure is changed by turning off the power of the apparatus during an unused time zone.

15. The apparatus of claim 12, wherein the transition time is set to a period.

* * * * *